US012103091B2

(12) United States Patent
Cohen (10) Patent No.: US 12,103,091 B2
(45) Date of Patent: Oct. 1, 2024

(54) TOOL HOLDER HAVING ANTI-VIBRATION ARRANGEMENT AND CUTTING TOOL PROVIDED WITH TOOL HOLDER

(71) Applicant: Iscar, Ltd., Tefen (IL)

(72) Inventor: Nir Cohen, Kibbutz Saar (IL)

(73) Assignee: ISCAR, LTD., Tefen (IL)

( * ) Notice: Subject to any disclaimer, the term of this patent is extended or adjusted under 35 U.S.C. 154(b) by 0 days.

(21) Appl. No.: 17/154,288

(22) Filed: Jan. 21, 2021

(65) Prior Publication Data

US 2022/0226912 A1 Jul. 21, 2022

(51) Int. Cl.
*B23B 29/02* (2006.01)

(52) U.S. Cl.
CPC ........ *B23B 29/022* (2013.01); *B23B 2250/16* (2013.01)

(58) Field of Classification Search
CPC . B23B 29/022; B23B 27/002; B23B 2250/16; B23B 2251/70; B23C 2250/16; B23C 5/003
See application file for complete search history.

(56) References Cited

U.S. PATENT DOCUMENTS

| | | | |
|---|---|---|---|
| 3,242,791 A * | 3/1966 | Smith | B23B 29/022 188/379 |
| 3,559,512 A * | 2/1971 | Aggarwal | F16F 7/10 188/322.5 |
| 3,642,378 A | 2/1972 | Hahn et al. | |
| 3,774,730 A | 11/1973 | Maddux | |
| 3,838,936 A * | 10/1974 | Andreassen | F16F 7/108 409/141 |
| 4,553,884 A * | 11/1985 | Fitzgerald | B23B 29/022 82/900 |
| 4,558,852 A | 12/1985 | Steiner et al. | |
| 6,443,673 B1 | 9/2002 | Etling et al. | |
| 7,234,379 B2 | 6/2007 | Claesson et al. | |
| 8,128,101 B2 * | 3/2012 | Retzbach | B23B 31/1179 408/239 R |
| 8,946,585 B2 | 2/2015 | Kappmeyer | |
| 9,533,357 B2 * | 1/2017 | Frota de Souza Filho | B23B 27/007 |

(Continued)

FOREIGN PATENT DOCUMENTS

| | | | |
|---|---|---|---|
| CH | 698558 B1 * | 8/2009 | ............ B23B 31/02 |
| JP | H07-3903 U | 1/1995 | |

(Continued)

OTHER PUBLICATIONS

International Search Report dated May 6, 2022, issued in PCT counterpart application (No. PCT/IL2021/051514).

(Continued)

*Primary Examiner* — Ryan Rufo
(74) *Attorney, Agent, or Firm* — Womble Bond Dickinson (US) LLP (57) ABSTRACT

An elongated tool holder includes a tool anti-vibration component having a mass housing portion and an anti-vibration arrangement. The anti-vibration arrangement includes an enclosed interior holder cavity formed in the mass housing portion. The anti-vibration arrangement also includes a vibration absorbing mass disposed within the holder cavity and elastically suspended therein by at least three non-torus shaped, resilient suspension members contacting an inwardly facing cavity wall surface. A cutting tool is provided with the tool holder.

36 Claims, 4 Drawing Sheets

(56) References Cited

U.S. PATENT DOCUMENTS

| | | |
|---|---|---|
| 9,579,730 B2 | 2/2017 | Frota De Souza Filho |
| 9,630,258 B2* | 4/2017 | McCormick ............ B23B 31/08 |
| 10,632,583 B1 | 4/2020 | Giannetti |
| 11,045,883 B2* | 6/2021 | Chen ..................... B23B 31/208 |
| 11,325,193 B2* | 5/2022 | Takagi .................. B23B 31/263 |
| 2003/0147707 A1 | 8/2003 | Perkowski |
| 2009/0209356 A1* | 8/2009 | Komine ................ B23B 31/083 |
| | | 470/103 |
| 2015/0056025 A1 | 2/2015 | Guo et al. |
| 2016/0107242 A1 | 4/2016 | McCormick et al. |
| 2016/0305503 A1 | 10/2016 | Freyermuth et al. |
| 2017/0173701 A1 | 6/2017 | Hecht et al. |
| 2018/0281074 A1* | 10/2018 | Eichelberger .......... F16F 7/108 |
| 2020/0147698 A1 | 5/2020 | Buck |
| 2021/0262544 A1* | 8/2021 | Fu ..................... B23Q 11/0035 |

FOREIGN PATENT DOCUMENTS

| | | |
|---|---|---|
| JP | 2000-288822 | 10/2000 |
| JP | 2002-079405 | 3/2002 |
| JP | 2003-62703 | 3/2003 |
| JP | 2008-100332 | 5/2008 |
| JP | 2011-42007 | 3/2011 |
| KR | 10-125859 | 4/2013 |
| SU | 1134300 | 1/1985 |
| SU | 1281347 | 1/1987 |
| WO | WO 2012/084688 | 6/2012 |

OTHER PUBLICATIONS

Written Opinion dated May 6, 2022, issued in PCT counterpart application (No. PCT/IL2021/051514).

* cited by examiner

TOOL HOLDER HAVING ANTI-VIBRATION ARRANGEMENT AND CUTTING TOOL PROVIDED WITH TOOL HOLDER

FIELD OF THE INVENTION

The subject matter of the present application relates to tool holders, in general, and to such tool holders having an anti-vibration arrangement, in particular, and to such an anti-vibration arrangement having at least three resilient suspension members further in particular.

BACKGROUND OF THE INVENTION

Tool holders can be provided with an anti-vibration arrangement for suppressing vibration of the tool holder during metal cutting operations. Typically, the anti-vibration arrangement is a spring-mass system that includes a cavity and a vibration absorbing mass suspended therein by elastic supporting members. The cavity can be filled with a viscous fluid.

In some such anti-vibration arrangements, said elastic supporting members can be formed from annular type structures (i.e. o-rings). Examples of such tool holding systems, are disclosed in, for example, U.S. Pat. No. 9,579,730, US 2016/305503, U.S. Pat. Nos. 7,234,379, 6,443,673 and 3,774,730.

In other such anti-vibration arrangements, said elastic supporting members can be formed from spherical elastic bodies. An example of such tool holding systems is described in JP2008100332A which discloses an anti-vibration tool having a weight elastically supported in a hollow part in a tool body by two substantially spherical elastic bodies. The center part of the weight and the tool body is formed into a conical recess so that the end surface of the tool body and the weight contacting the spherical elastic body easily coincides with the axial center of the weight and the tool body.

It is an object of the subject matter of the present application to provide a new and improved anti-vibration arrangement.

SUMMARY OF THE INVENTION

In accordance with a first aspect of the subject matter of the present application there is provided a tool holder, elongated along a holder longitudinal axis thereof and comprising:
  a mass housing portion; and
  an anti-vibration arrangement comprising:
  an interior holder cavity formed in the mass housing portion and having an inwardly facing cavity wall surface;
  a vibration absorbing mass having a mass central axis and comprising two axially opposite mass ends and at least three mass recesses; and
  at least three non-torus shaped, resilient suspension members, each suspension member being partially located in a respective mass recess and protruding outwardly therefrom, wherein:
    the tool holder is adjustable between an unassembled state and an assembled state, and in the assembled state:
      the vibration absorbing mass is disposed in the interior holder cavity and is elastically suspended therein by the at least three suspension members contacting the inwardly facing cavity wall surface, and thereby forming an oscillating space located between the vibration absorbing mass and the inwardly facing cavity wall surface.

In accordance with a second aspect of the subject matter of the present application there is provided a cutting tool comprising:
  a tool holder of the type described above; and
  a cutting portion comprising at least one cutting insert.

It is understood that the above-said is a summary, and that features described hereinafter may be applicable in any combination to the subject matter of the present application, for example, any of the following features may be applicable to the tool holder or the cutting tool:

The at least three suspension members can be under compressive elastic deformation by contact against the inwardly facing cavity wall surface and the respective mass recess.

The at least three suspension members can be formed from a material different from that of the vibration absorbing mass.

In the unassembled state, the vibration absorbing mass can be disposed outside the interior holder cavity. Each of the at least three suspension members can be releasably retained in a respective one of the at least three mass recesses of the vibration absorbing mass, by the respective suspension member being under compressive elastic deformation by contact against only a mass recess peripheral surface of the respective one of the at least three mass recesses.

Each of the at least three suspension members can have a spherical shape defined by a suspension member radius.

The vibration absorbing mass can be elongated along the mass central axis.

In the assembled state of the tool holder, the mass central axis can parallel to the holder longitudinal axis.

The mass central axis can be co-incident with the holder longitudinal axis.

The vibration absorbing mass can have a constant cross-sectional area in a plane oriented perpendicular to the mass central axis.

In an end view of the vibration absorbing mass, each mass recess can subtend a mass recess angle from the mass central axis. For any given mass end having two or more mass recesses, the mass recesses can be equally angularly spaced apart from one another about the mass central axis by a recess separation angle. The recess separation angle can be less than the mass recess angle.

The at least three mass recesses can be formed at the two opposite mass ends, at least one mass recess being formed at each mass end.

The vibration absorbing mass can comprise two mass end surfaces and a mass peripheral surface extending therebetween about the mass central axis, the two mass end surfaces and the mass peripheral surface intersecting to form two mass edges. Each of the at least three mass recesses can be formed at least partially in one of the two mass end surfaces.

Each of the at least three mass recesses can be formed partially in one of the two mass end surfaces and partially in the mass peripheral surface so as to intersect one of the two mass edges.

Each mass end surface can be rotationally symmetrical about the mass central axis.

The two mass end surfaces can be identical.

The two mass end surfaces can be rotationally offset from one another about the mass central axis by a rotation angle.

For any mass end having two or more mass recesses, the mass recesses can be equally angularly offset about the mass central axis by an offset angle. The rotation angle can be equal to half the offset angle.

Each suspension member can protrude outwardly from the respective mass recess in both a radial direction and an axial direction, with respect to the mass central axis.

The mass peripheral surface distal the mass end surfaces can have a cylindrical shape defined by a mass radius.

The at least three suspension members can have a spherical shape defined by a suspension member radius. The mass radius can be between three to four times the size of the suspension member radius.

The two mass end surfaces can be planar and oriented transversely to the mass central axis.

For any mass end having two or more mass recesses, the mass recesses can be angularly offset from one another about the mass central axis.

The mass recesses can be equally angularly offset from one another about the mass central axis by an offset angle.

The cavity wall surface can comprise two opposite cavity wall end surfaces and a cavity wall peripheral surface extending therebetween, the cavity wall peripheral surface extending about the cavity central axis. In the assembled position of the tool holder, each suspension member can abut the cavity wall peripheral surface and one of the two planar cavity wall end surfaces simultaneously.

The two cavity wall end surface can be planar.

The vibration absorbing mass can comprise an equal number of N mass recesses at each mass end.

N can equal 6.

The at least three mass recesses can be formed at the two opposite mass ends (60). The anti-vibration arrangement can comprise a tuning member which can be displaceable along the cavity central axis and which can abut the suspension members at one of the mass ends.

The tuning member can comprise a planar tuning abutment surface. The tuning abutment surface can abut said suspension members at said one of the mass ends.

The oscillating space can be devoid of a viscous fluid.

The mass housing portion can comprise a first metallic material. The vibration absorbing mass can comprise a second metallic material. The second metallic material can be denser than the first metallic material.

The cutting portion can be releasably attached to the tool holder.

The anti-vibration arrangement can be disposed at a forward end of the cutting tool.

The cutting tool can be a rotary cutting tool, designed to rotate about a rotational axis.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figures 1, 2:
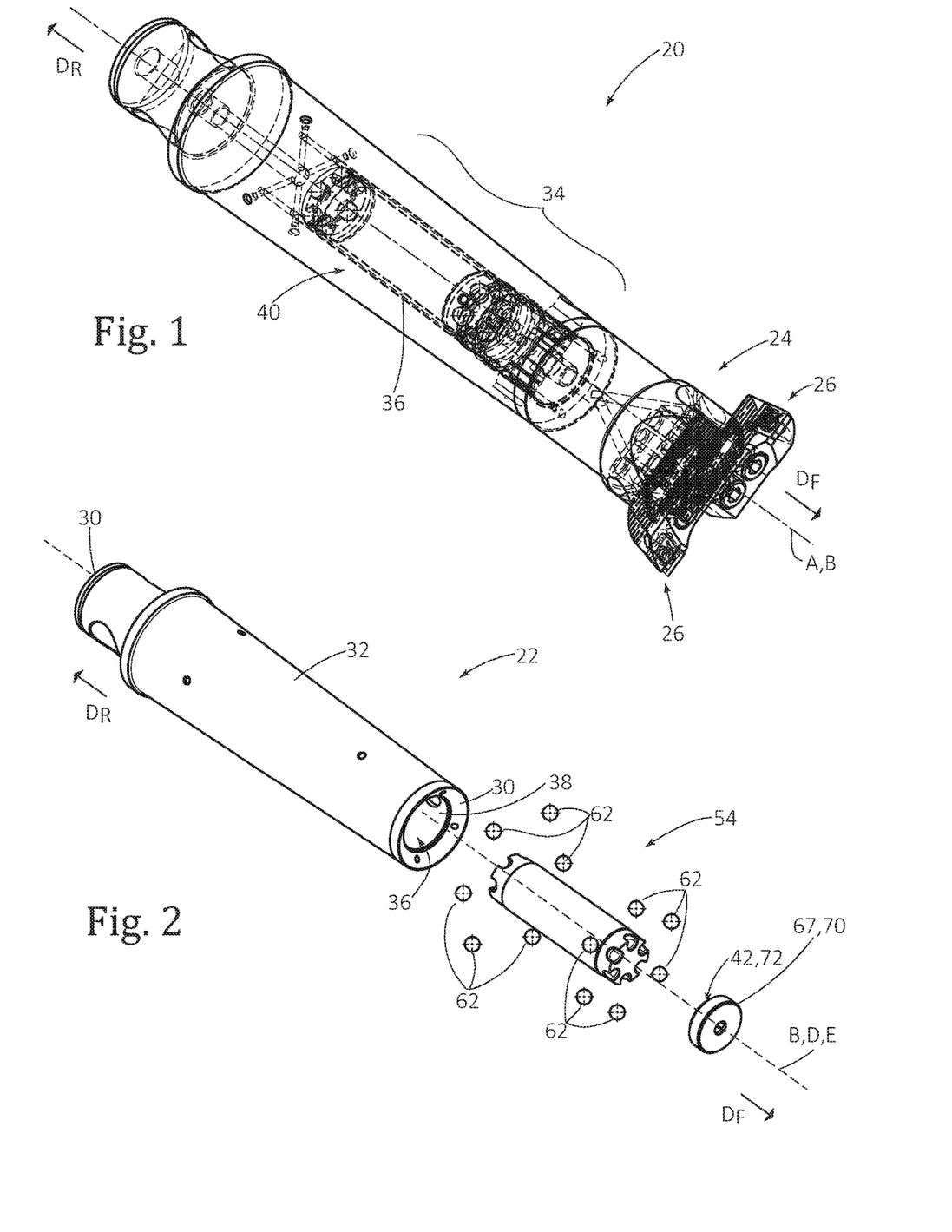
FIG. 1 is a perspective view of a cutting tool in accordance with the present application, showing an anti-vibration arrangement.
FIG. 2 is an exploded perspective view of a tool holder in FIG. 1, in accordance with the present application.

Attention is first drawn to FIG. 1 showing a cutting tool 20, for chip removal, depicting an aspect of the present application. The cutting tool 20 has a tool longitudinal axis A. In accordance with some embodiments of the subject matter of the present application, the cutting tool 20 can be rotary cutting tool. That is to say, the cutting tool 20 is designed to rotate about a rotational axis. In this non-limiting example shown in the drawings, the cutting tool 20 is a milling tool. However, the subject matter of the present application is not restricted only to milling tools and could also be applicable to, for example but not limited to, a drilling tools. The subject matter of the present application may also be applicable to non-rotary cutting tools, such as boring bars. For such non-rotary cutting tools, the cutting tool 20 is not designed to be rotatable in a direction of rotation about the tool longitudinal axis A.

The cutting tool 20 includes a tool holder 22. The cutting tool 20 also includes a cutting portion 24 that includes at least one cutting insert 26. The at least one cutting insert 26 is designed to perform metal cutting operations and has a cutting edge for that purpose. In accordance with some embodiments of the subject matter of the present application, the at least one cutting insert 26 can be releasably attached to the cutting portion 24. The cutting portion 24 can be integrally formed with the tool holder 22. Alternatively, the cutting portion 24 can be releasably attached to the tool holder 22. The cutting portion 24 can be disposed at a forward end of the tool holder 22.

Reference is now made to FIG. 2, showing the tool holder 22, depicting another aspect of the present application. The tool holder 22 has a holder longitudinal axis B, that defines opposite forward and rear directions $D_F$, $D_R$. The tool holder 22 is elongated along the holder longitudinal axis B. In accordance with some embodiments of the subject matter of the present application, the cutting tool 20 and the tool holder 22 can be co-axial with each other. It should be noted that two elements (e.g. the cutting tool 20 and the tool holder 22 in the present case) are co-axial with each other when their longitudinal axes are co-incident (aligned with other).

Figure 3:
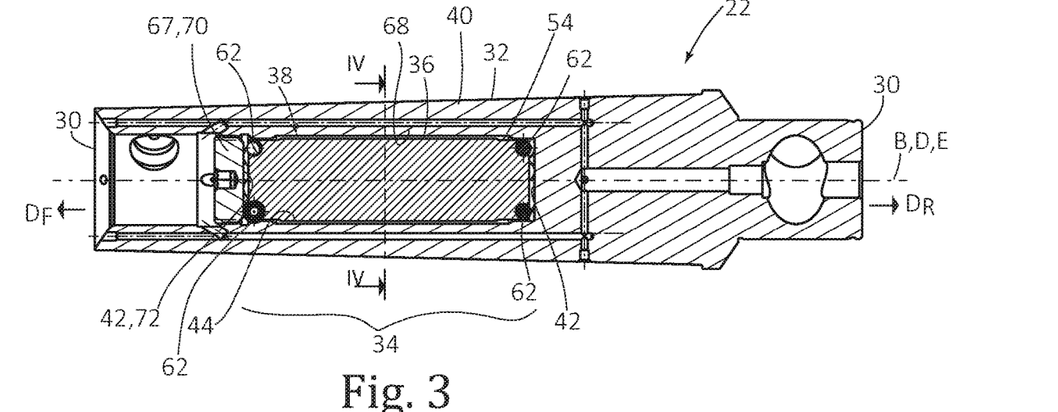
FIG. 3 is an axial cross-sectional view of the tool holder in FIG. 2.
Figure 4:
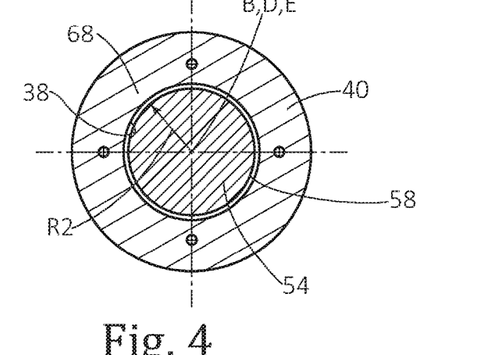
FIG. 4 is a radial cross-sectional view of the tool holder in FIG. 2 taken along line IV-IV in FIG. 3.
Figure 5:
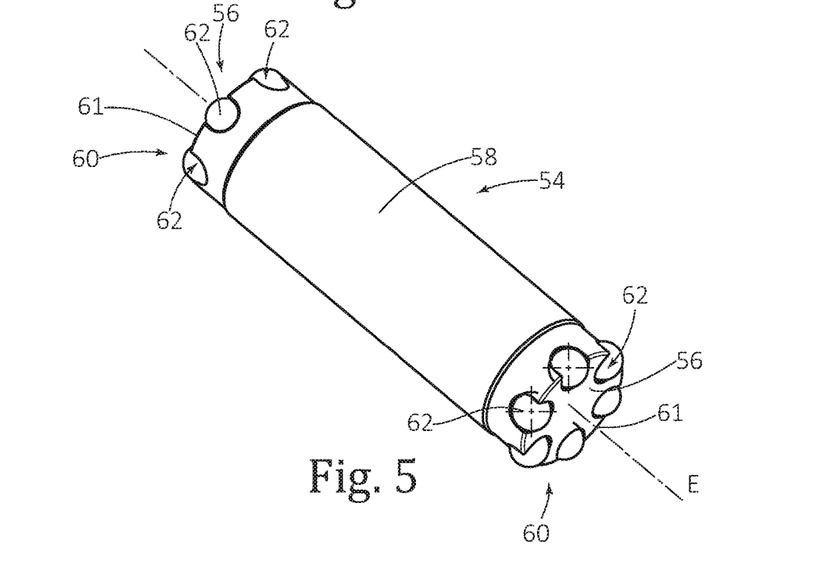
FIG. 5 is a perspective view of the anti-vibration arrangement in FIG. 2.

It should further be noted that use of the terms "forward" and "rearward" throughout the description and claims refer to a relative position in a direction of the holder longitudinal axis B towards the left and right, respectively, in FIG. 3. Generally speaking, the forward direction is the direction towards the cutting portion 26.

In accordance with some embodiments of the subject matter of the present application, the tool holder 22 can include two opposite holder end surfaces 30 and a holder peripheral surface 32 that extends therebetween. The holder peripheral surface 32 can extend about the holder longitudinal axis B.

The tool holder 22 includes a mass housing portion 40 and an anti-vibration arrangement 34. The tool anti-vibration arrangement 34 is designed to reduce or eliminate vibration of the cutting tool 20 when the cutting tool 20 performs a metal cutting operation. In accordance with some embodiments of the subject matter of the present application, the anti-vibration arrangement 34 can be disposed at a forward end of the cutting tool 20.

The anti-vibration arrangement 34 includes an interior holder cavity 36 that is formed in the mass housing portion 40. That is to say, the interior holder cavity 36 is enclosed within the mass housing portion 40. The holder cavity 36 is formed by an inwardly facing cavity wall surface 38. The cavity wall surface 38 delimits the holder cavity 36 from the mass housing portion 40. The mass housing portion 40 surrounds the holder cavity 36. The holder cavity 36 has a cavity central axis D. In accordance with some embodiments of the subject matter of the present application, the holder cavity 36 can be elongated along a cavity central axis D. The holder cavity 36 can be elongated in the same direction as the tool holder 22. In particular, the holder cavity 36 can be co-axial with the tool holder 22. The cavity wall surface 38 can include two opposite cavity wall end surfaces 42 and a cavity wall peripheral surface 44 that extends therebetween. The cavity wall peripheral surface 44 can extend about the cavity central axis D.

Referring in addition to FIG. 3, showing an axial cross-sectional view of the holder cavity 36 (taken in a plane containing the cavity central axis D) through the cavity wall peripheral surface 44, the holder cavity 36 has a cavity transverse cross-section. In accordance with some embodiments of the subject matter of the present application, said cavity transverse cross-section can be uniform along the cavity central axis D. The cavity wall peripheral surface 44 can have a generally cylindrical shape. The cavity wall peripheral surface 44 can have a cylindrical shape in the vicinity of the two cavity wall end surface 42 (where the cavity wall peripheral surface 44 abuts a suspension member 62 as described later in the description). The two cavity wall end surfaces 42 can be planar and oriented transversely to the cavity central axis D. The two cavity wall end surfaces 42 can be oriented perpendicular to the cavity central axis D.

Reverting to FIGS. 1 and 2, the anti-vibration arrangement 34 also includes a vibration absorbing mass 54. In accordance with some embodiments of the subject matter of the present application, the vibration absorbing mass 54 can be rigid. In some embodiments, while the mass housing portion 40 is formed from a first metallic material such as steel, the vibration absorbing mass 54 may be formed from a denser second metallic material, such as tungsten.

Referring to FIGS. 4-7, the vibration absorbing mass 54 has a mass central axis E. The vibration absorbing mass 54 includes two axially opposite mass ends 60. The two axially opposite mass ends 60 are spaced apart from one another along the mass central axis E. In accordance with some embodiments of the subject matter of the present application, the vibration absorbing mass 54 can include two opposite mass end surfaces 56 and a mass peripheral surface 58 that extends therebetween. The mass peripheral surface 58 can extend about the mass central axis E. The two mass end surfaces 56 are located at the two mass ends 60, respectively. The two mass end surfaces 56 and the mass peripheral surface 58 can intersect to form two mass edges 61. The vibration absorbing mass 54 can be elongated along the mass central axis E. The vibration absorbing mass 54 can have a generally constant cross-sectional area in a plane oriented perpendicular to the mass central axis E.

Referring to FIGS. 2 and 5-7, the vibration absorbing mass 54 includes at least three mass recesses 64. Each mass recesses 64 is recessed in the vibration absorbing mass 54. The at least three mass recesses 64 are designed to receive a suspension member as described later in the description. Each mass recess 64 is defined by a mass recess peripheral surface 66. In accordance with some embodiments of the subject matter of the present application, the at least three mass recesses 64 can be identical. The at least three mass recesses 64 can be concavities. The at least three mass recesses 64 can have a partially spherical basic shape. That is to say, each mass recess peripheral surface 66 can lie substantially on an imaginary sphere, facing inwards towards the center of said imaginary sphere.

Figures 6, 7:
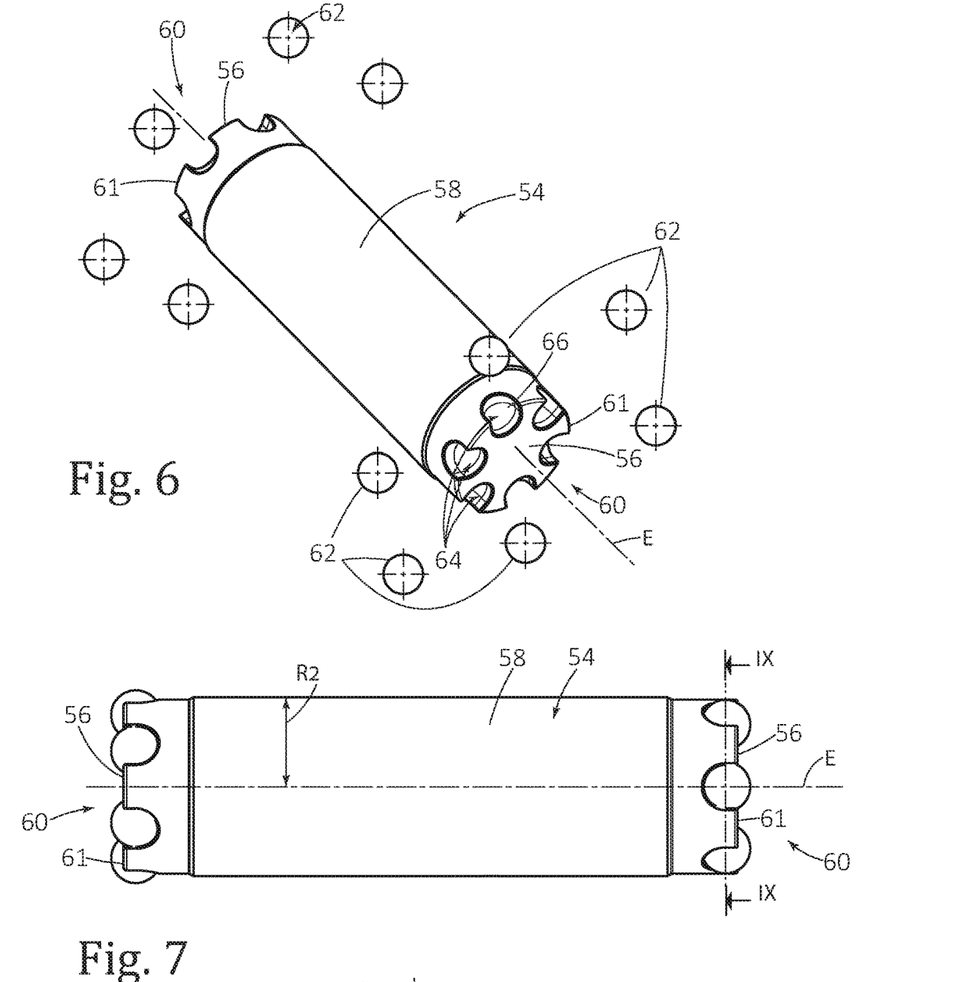
FIG. 6 is an exploded perspective view of parts of the anti-vibration arrangement in FIG. 1.
FIG. 7 is a side view of the parts of the anti-vibration arrangement in FIG. 5.

As best seen in FIG. 6, in accordance with some embodiments of the subject matter of the present application, the at least three mass recesses 64 can be formed at the two opposite mass ends 60, with at least one mass recess 64 formed at each mass end 60. Each of the at least three mass recesses 64 can be formed at least partially in the two mass end surfaces 56. In particular, each of the at least three mass recesses 64 can be disposed at the periphery of the vibration absorbing mass 54. Each of the at least three mass recesses 64 can be formed partially in one of the two mass end surfaces 56 and partially in the mass peripheral surface 58 so as to intersect one of the two mass edges 61. None of the at least three mass recesses 64 may be intersected by the mass central axis E. It is noted that the at least three mass recesses 64 are not annular recesses, extending about the entire 360° circumference extent of the cavity central axis D. Thus, they are not suitable for receiving o-rings.

Figure 8:
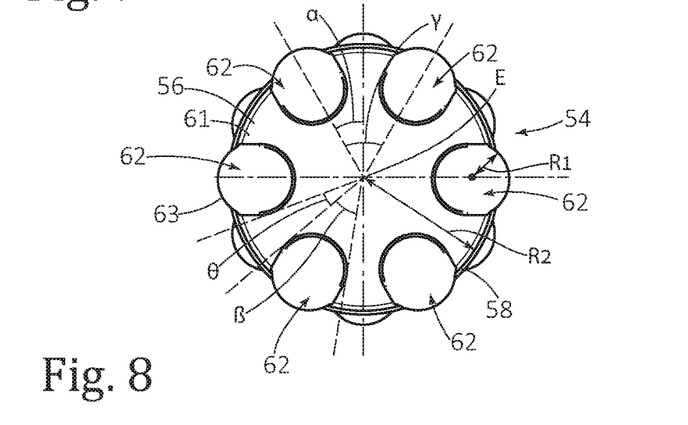
FIG. 8 is an end view of the parts of the anti-vibration arrangement in FIG. 5.

Referring to FIG. 8, for any mass end 60 having two or more mass recesses 64, the mass recesses 64 can be angularly offset from one another about the mass central axis E. The mass recesses 64 can be equally angularly offset from one another about the mass central axis E by an offset angle γ. Such a configuration provides a stable elastic suspension of the vibration absorbing mass 54 within the interior holder cavity 36. In an end view of the vibration absorbing mass 54, for any given mass end 60 having two or more mass recesses 64, the mass recesses 64 can be equally angularly spaced apart from one another about the mass central axis E by a recess separation angle θ. In an end view of either mass end 60 of the vibration damping mass 54, all suspension members 62 at each of the two mass ends 60 are visible. And in such an end view, all suspension members 62 provided at one (proximate) mass end 60 are seen to be angularly offset from all the suspension members 62 provided at the opposite (distal) mass end 60.

In accordance with some embodiments of the subject matter of the present application, the vibration absorbing mass 54 can include an equal number of N mass recesses 64 at each mass end 60 (N being greater than one) thereby forming a total of 2*N mass recesses 64 in the vibration absorbing mass 54. In the non-limiting example shown in the drawings, N can be equal to six (that is to say, there is a total of twelve mass recesses 64, six at each end mass end 60).

Referring to FIG. 7, in accordance with some embodiments of the subject matter of the present application, the mass end surfaces 56 can be planar and oriented perpendicular to the mass central axis E. Referring to FIG. 8, the mass peripheral surface 58 distal the mass end surfaces 56 can have a cylindrical shape defined by a mass radius R2. Each mass end surface 56 (including any mass recesses 64 located thereat) can be rotationally symmetrical about the mass central axis E. The two mass end surfaces 56 can be identical. The two mass end surfaces 56 can be rotationally offset from one another about the mass central axis E by a rotation angle α. The rotation angle α can be equal to half the offset angle γ. Stated differently, in a view along the mass central axis E, for any given adjacent pair of mass recesses 64 at a given mass end surface 56, a mass recess 64 at the opposite mass end surface 56 is located exactly angularly halfway between said given adjacent pair of mass recesses 64. Making reference to FIG. 8, in an end view of the vibration absorbing mass 54, each mass recess 64 subtends a mass recess angle β from the mass central axis E. The mass recess angle β is defined by the angular extremities of the mass recess 64 about the mass central axis E. The recess separation angle θ can be less than the mass recess angle β.

In accordance with some embodiments of the subject matter of the present application, the cavity wall peripheral surface 44 can have a shape that matches the shape of the mass peripheral surface 58. One or both of the two cavity wall end surfaces 42 can have a shape that matches the shape of the corresponding mass end surface 56. Thus, the holder cavity 36 can have a shape that matches the shape of the vibration absorbing mass 54.

The anti-vibration arrangement 34 includes at least three resilient suspension members 62. Each suspension member 62 is defined by a suspension member peripheral surface 63. The at least three suspension members 62 are elastically deformable. In accordance with some embodiments of the subject matter of the present application, the number of suspension members 62 can match the number of mass recesses 64. The at least three suspension members 62 can be formed from a material different from that of the vibration absorbing mass 54. In some embodiments, the suspension members 62 are made of rubber, having a Durometer hardness of between 60 A to 95 A.

Figure 9:
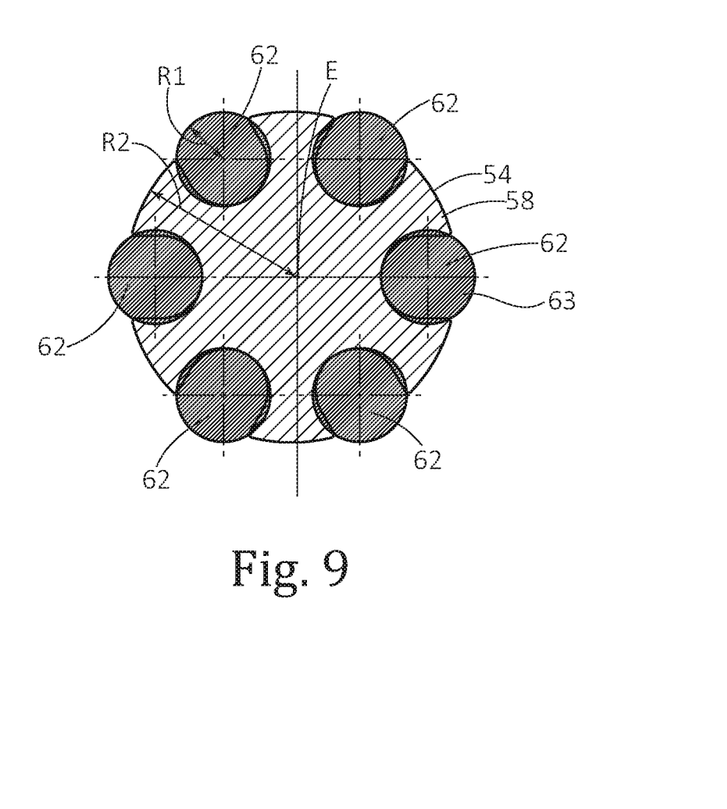
FIG. 9 is a radial cross-sectional view of the parts of the anti-vibration arrangement in FIG. 5, taken along line IX-IX in FIG. 7.

The at least three suspension members 62 are non-torus shaped (i.e. non-annular). That is to say, the at least three suspension members 62 are not be o-rings. In accordance with some embodiments of the subject matter of the present application, generally speaking, the at least three suspension members 62 can have a shape that corresponds to the shape of the at least three mass recesses 64. The at least three suspension members 62 can be balls. The at least three suspension members 62 can have a spherical shape (i.e. balls). That is to say, each suspension peripheral surface member 63 can lie on an imaginary sphere, facing outwards from the center of said imaginary sphere. Referring to FIGS. 8 and 9, each suspension member 62 can be defined by a suspension member radius R1. The mass radius R2 can be between three to four times the size of the suspension member radius R1. Stated differently, the mass radius R2 can be between 300% and 400% the magnitude of the suspension member radius R1. Preferably, the mass radius R2 can be between 325% and 375% the magnitude of the suspension member radius R1. The at least three suspension members 62 can be solid. That is to say, the at least three suspension members 62 are not hollow. The at least three suspension members 62 are not fluid.

The tool holder 22 is adjustable between an unassembled state and an assembled state. In the unassembled state of the tool holder 22, the vibration absorbing mass 54 is disposed outside the interior holder cavity 36. In accordance with some embodiments of the subject matter of the present application, each of the at least three suspension members 62 can be releasably retained in a respective one of the at least three mass recesses 64 of the vibration absorbing mass 54, by each respective suspension member 62 being under compressive elastic deformation by contact against only the mass recess peripheral surface 66 of the respective one of the at least three mass recesses 64. For example, each suspension member 62 can be squeezed into a respective mass recess 64 so that the suspension member peripheral surface 63 is urged against and abuts the mass recess peripheral surface 66.

In accordance with some embodiments of the subject matter of the present application, the tool holder 22 includes a cavity axial sealing member 67 which defines the holder cavity 36 in the forward direction $D_F$, and which seals the holder cavity 36. That is to say, the cavity axial sealing member 67 forms one of the cavity wall end surface 38. While the holder cavity 36 is unsealed by the cavity axial sealing member 67 (i.e. while the tool holder 22 is in an unassembled position), the vibration absorbing mass 54 can be inserted into the holder cavity 36. It is noted that the vibration absorbing mass 54 is reversible. That is to say, the vibration absorbing mass 54 can be inserted into the holder cavity 36 in both longitudinal orientations.

In the assembled state of the tool holder 22, the vibration absorbing mass 54 is disposed within the holder cavity 36. The holder cavity 36 is sealed by the cavity axial sealing member 67. Each suspension member 62 is partially located in a respective mass recess 64 and protrudes outwardly therefrom. In accordance with some embodiments of the subject matter of the present application, each suspension member 62 can protrude outwardly from the respective mass recess 64 in a radial direction and/or an axial direction, with respect to the mass central axis E. In this non-limiting example shown in the drawings, the mass recesses 64 intersect the mass edges 61, and each suspension member 62 can protrude outwardly from the respective mass recess 64 in both the radial direction and the axial direction. Each suspension member 62 can abut the cavity wall surface 38. Specifically, in the configuration described above where each suspension member 62 can protrude outwardly from the respective mass recess 64 in the radial direction and the axial direction, each suspension member 62 can abut the cavity wall peripheral surface 44 and one of the two cavity wall end surfaces 42 simultaneously.

In the assembled position of the tool holder 22, the vibration absorbing mass 54 can be elongated in the same direction as the tool holder 22. That is to say, the mass central axis E can be parallel to the holder longitudinal axis B. In particular, the mass central axis E can be co-incident with the holder longitudinal axis B (i.e. the vibration absorbing mass 54 can be co-axial with the tool holder 22).

In the assembled position of the tool holder 22, the vibration absorbing mass 54 is connected to the mass housing portion 40 via the at least three suspension members 62. Thus, the vibration absorbing mass 54 is elastically suspended in the holder cavity 36 by the at least three suspension members 62 contacting the inwardly facing cavity wall surface 38. It is noted that no part of the mass peripheral surface 58 is in direct contact with the inwardly facing cavity wall surface 38. In accordance with some embodiments of the subject matter of the present application, the at least three suspension members 62 can be under compressive elastic deformation by contact against the inwardly facing cavity wall surface 38 and a respective mass recess 64.

In the configuration having each suspension member 62 protruding outwardly from the respective mass recess 64 in the axial direction, the suspension member 62 can be under compressive elastic deformation in the axial directions. Additionally, in the configuration having the mass recesses 64 equally angularly offset from one another about the mass central axis E (so that each suspension member 62 has one or more different suspension members 62 that counteract against it) and having each suspension member 62 protruding outwardly from the respective mass recess 64 in the radial direction, the suspension member 62 can also be under compressive elastic deformation in the radial.

A portion of the suspension member 62 can be located between the mass peripheral surface 58 and the cavity wall peripheral surface 44. Likewise, another portion of the suspension member 62 can be located between the mass end surface 56 and the cavity wall end surfaces 44. Thus, the possibility of the vibration absorbing mass 54 impacting the cavity wall end surface 38, during metal cutting operations is reduced and even prevented.

As an alternative configuration to the foregoing, the cavity wall surface 38 can include a recess (preferably conical), for receiving a portion of a respective suspension member 62, located away from the periphery of the cavity wall end surface 38. In this configuration too, the suspension member 62 can be under compressive elastic deformation in both the radial and axial directions simultaneously. The recess prevents the suspension member 62 from sliding along the cavity wall surface 38. This is particularly advantageous in a configuration having just one suspension member 62 at one of the two mass ends 60.

The anti-vibration arrangement 34 includes an oscillating space 68 formed in the holder cavity 36. The oscillating space 68 is located between the vibration absorbing mass 54 and the mass housing portion 40 (and more particularly between the vibration absorbing mass 54 and the inwardly facing cavity wall surface 38). Stated differently, the mass housing portion 40 and the vibration absorbing mass 54 are spaced apart by the oscillating space 68. In accordance with some embodiments of the subject matter of the present application, the oscillating space 68 entirely circumferentially surrounds the vibration absorbing mass 54. That is to say, the oscillating space 68 can extend about the full (360°) angular extent of the cavity central axis D. The oscillating space 68 can form an internal annular slit at the vibration absorbing mass 54.

The vibration absorbing mass 54 is configured to oscillate within the oscillating space 68 upon elastic deformation of the at least three suspension members 62. Stated differently, the vibration absorbing mass 54 is oscillatingly displaceable within the oscillating space 68 when the at least three suspension members 62 undergo elastic deformation.

When the cutting tool 20 encounters a workpiece, it is susceptible to vibration. Typically, for turning or milling cutting operations the vibrations are lateral vibrations. Typically, for drilling cutting operations, the vibrations are torsional vibrations. The vibration absorbing mass 54 oscillates at a vibration frequency. The anti-vibration arrangement is 34 designed to provide the vibration absorbing mass 54 with a vibration frequency close or identical to the natural frequency of the cutting tool 20, thereby reducing or eliminating vibration of the cutting tool 20.

Advantageously, the anti-vibration arrangement 34 can be tunable (so that the vibration frequency of the vibration absorbing mass 54 matches the natural frequency of the cutting tool 20) without the need to disassemble any separable parts. One or more mechanisms, alone or in combination, can be used to alter the vibration frequency at which the vibration absorbing mass 54 oscillates. In one non-limiting example, the at least three suspension member 62 can be pre-loaded. For example, referring to FIG. 3, the anti-vibration arrangement 34 can include a tuning member 70 that protrudes into the oscillating space 68. The tuning member 70 can be formed from the sealing member 67. The tuning member 70 can abut one or more of the at least three suspension members 62. The tuning member 70 can be displaceable along the cavity central axis D thereby adjusting the elastic properties of the at least three suspension members 62. The tuning member 70 can include a planar tuning abutment surface 72. The tuning abutment surface 72 abuts said suspension members 62 at said one of the mass ends 60. It is understood that in such a configuration the tuning abutment surface 72 forms part of the inwardly facing cavity wall surface 38.

In accordance with some embodiments of the subject matter of the present application, the oscillating space 68 can be empty. For example, the oscillating space 68 can be devoid of viscous fluid.

The vibration absorbing mass 54 can be manufactured from the second metallic material while the mass housing portion 40 can be manufactured from the first metallic material. Moreover, by using various second metallic materials (with varying densities), the weight of the vibration absorbing mass 54 can be altered without changing the dimensions thereof.

It should be noted that known anti-vibration arrangements using o-rings for damping require o-rings of different sizes for different diameter masses. On the contrary, one feature of the subject matter of the present application is that the same sized suspension members 62 are suitable for different diameter vibration absorbing masses 54. It is also noted that o-rings typically require a groove or cut-away portion (for receiving the o-ring) that extends around the entire 360° circumference thereof. For example, U.S. Pat. No. 6,443,673 discloses a conical surface at the end of the absorber mass (i.e. an annular chamfered edge). This cut-away portion is formed by the removal of material and thus detrimentally reduces the weight of the mass. Another feature of the subject matter of the present application is that less material is removed from the vibration absorbing mass 54 for providing the angularly spaced apart mass recesses 64, as compared to providing for o-rings.

It should be further noted that another feature of the subject matter of the present application is that the anti-vibration arrangement 34 is suitable for neutralizing lateral vibrations and torsional vibrations.

It should be yet further noted that the configuration having the mass recesses 64 angularly offset about the mass central axis E at each mass end 60 advantageously provides predetermined points of contact on the cavity wall end surface 42 by the suspension members 62.

It should be yet still further noted that the configuration having N greater than or equal to two and less than or equal to eight (with a suspension member located in each mass recess 64) provides optimal vibration suppression.

Although the subject matter of the present application has been described to a certain degree of particularity, it should be understood that various alterations and modifications could be made without departing from the spirit or scope of the invention as hereinafter claimed.

What is claimed is:

1. A tool holder (22), elongated along a holder longitudinal axis (B) thereof and comprising:
a mass housing portion (40); and
an anti-vibration arrangement (34) comprising:
an interior holder cavity (36) formed in the mass housing portion (40) and having an inwardly facing cavity wall surface (38);
a vibration absorbing mass (54) having a mass central axis (E) and comprising:
two axially opposite mass ends (60), each mass end (60) having a mass end surface (56);
a mass peripheral surface (58) extending between the two mass end surfaces (56) about the mass central axis (E), the two mass end surfaces (56) and the mass peripheral surface (58) intersecting to form two mass edges (61);
at least three mass recesses (64) formed at each mass end (60), each mass recess (64) having a non-annular shaped, resilient suspension member (62) partially located therein and protruding outwardly therefrom;
wherein:
all of said at least three mass recesses (64) at each mass end (60) have a non-annular shape and are not configured for receiving an o-ring;
said at least three mass recesses (64) at each mass end (60) are all radially spaced apart from the mass central axis (E);
at each mass end (60), each of said at least three mass recesses (64) is formed partially in a corresponding one of the two mass end surfaces (56) and partially in the mass peripheral surface (58) so as to intersect one of the two mass edges (61);
in an end view of the vibration absorbing mass (54):
the at least three suspension members (62) at each of the two mass ends (60) are visible; and
all of the at least three suspension members (62) at one mass end (60) are seen to be angularly offset from all of the at least three suspension members (62) provided at the opposite mass end (60), and
the tool holder (22) is adjustable between an unassembled state and an assembled state, and in the assembled state:
the vibration absorbing mass (54) is disposed in the interior holder cavity (36) and is elastically suspended therein by the at least three suspension members (62) at each mass end contacting the inwardly facing cavity wall surface (38), and thereby forming an oscillating space (68) located between the vibration absorbing mass (54) and the inwardly facing cavity wall surface (38).

2. The tool holder (22), according to claim 1, wherein the at least three suspension members (62) are under compressive elastic deformation by contact against the inwardly facing cavity wall surface (38) and the respective mass recess (64).

3. The tool holder (22), according to claim 1, wherein the at least three suspension members (62) are formed from a material different from that of the vibration absorbing mass (54).

4. The tool holder (22), according to claim 3, wherein in the unassembled state:
the vibration absorbing mass (54) is disposed outside the interior holder cavity (36); and
each of the at least three suspension members (62) is releasably retained in a respective one of the at least three mass recesses (64) of the vibration absorbing mass (54), by the respective suspension member (62) being under compressive elastic deformation by contact against only a mass recess peripheral surface (66) of the respective one of the at least three mass recesses (64).

5. The tool holder (22), according to claim 1, wherein each of the at least three suspension members (62) has a spherical shape defined by a suspension member radius (R1).

6. The tool holder (22), according to claim 1, wherein the vibration absorbing mass (54) is elongated along the mass central axis (E).

7. The tool holder (22), according to claim 6, wherein in the assembled state of the tool holder (22), the mass central axis (E) is parallel to the holder longitudinal axis (B).

8. The tool holder (22), according to claim 7, wherein the mass central axis (E) is co-incident with the holder longitudinal axis (B).

9. The tool holder (22), according to claim 1, wherein the vibration absorbing mass (54) has a constant cross-sectional area in a plane oriented perpendicular to the mass central axis (E).

10. The tool holder (22), according to claim 1, wherein:
in an end view of the vibration absorbing mass (54):
each mass recess (64) subtends a mass recess angle ($\beta$) from the mass central axis (E);
for any given mass end (60) having two or more mass recesses (64), the mass recesses (64) are equally angularly spaced apart from one another about the mass central axis (E) by a recess separation angle ($\theta$); and
the recess separation angle ($\theta$) is less than the mass recess angle ($\beta$).

11. The tool holder (22), according to claim 1, wherein each mass end surface (56) is rotationally symmetrical about the mass central axis (E).

12. The tool holder (22), according to claim 1, wherein the two mass end surfaces (56) are identical.

13. The tool holder (22), according to claim 12, wherein the two mass end surfaces (56) are rotationally offset from one another about the mass central axis (E) by a rotation angle ($\alpha$).

14. The tool holder (22), according to claim 13, wherein:
the mass recesses (64) are equally angularly offset about the mass central axis (E) by an offset angle ($\gamma$); and
the rotation angle ($\alpha$) is equal to half the offset angle ($\gamma$).

15. The tool holder (22), according to claim 1, wherein each suspension member (62) protrudes outwardly from the respective mass recess (64) in both a radial direction and an axial direction, with respect to the mass central axis (E).

16. The tool holder (22), according to claim 1, wherein the mass peripheral surface (58) distal the mass end surfaces (56) has a cylindrical shape defined by a mass radius (R2).

17. The tool holder (22), according to claim 16, wherein:
the at least three suspension members (62) have a spherical shape defined by a suspension member radius (R1); and
the mass radius (R2) is between three to four times the size of the suspension member radius (R1).

18. The tool holder (22), according to claim 1, wherein the two mass end surfaces (56) are planar and oriented transversely to the mass central axis (E).

19. The tool holder (22), according to claim 18, wherein the mass recesses (64) are equally angularly offset from one another about the mass central axis (E) by an offset angle (γ).

20. The tool holder (22), according to claim 18:
the cavity wall surface (38) comprises two opposite cavity wall end surfaces (42) and a cavity wall peripheral surface (44) extending therebetween, the cavity wall peripheral surface (44) extending about the cavity central axis (D); and
in the assembled position of the tool holder (22), each suspension member (62) abuts the cavity wall peripheral surface (44) and one of the two planar cavity wall end surfaces (42) simultaneously.

21. The tool holder (22), according to claim 20, wherein the two cavity wall end surface (42) are planar.

22. The tool holder (22), according to claim 1, wherein the vibration absorbing mass (54) comprises an equal number of N mass recesses (64) at each mass end (60).

23. The tool holder (22), according to claim 22, wherein N=6.

24. The tool holder (22), according to claim 1, wherein:
the anti-vibration arrangement (34) comprises a tuning member (70) which is displaceable along the cavity central axis (D) and abuts the suspension members (62) at one of the mass ends (60).

25. The tool holder (22), according to claim 24, wherein:
the tuning member (70) comprises a planar tuning abutment surface (72); and
the tuning abutment surface (72) abuts said suspension members (62) at said one of the mass ends (60).

26. The tool holder (22), according to claim 1, wherein the oscillating space (68) is devoid of a viscous fluid.

27. The tool holder (22), according to claim 1, wherein:
the mass housing portion (40) comprises a first metallic material;
the vibration absorbing mass (54) comprises a second metallic material; and
the second metallic material is denser than the first metallic material.

28. A cutting tool (20) comprising:
the tool holder (22) of claim 1; and
a cutting portion (24) comprising at least one cutting insert (26).

29. The cutting tool (20), according to claim 28, wherein the cutting portion (24) is releasably attached to the tool holder (22).

30. The cutting tool (20), according to claim 28, wherein the anti-vibration arrangement (34) is disposed at a forward end of the cutting tool (20).

31. The cutting tool (20), according to claim 28, wherein the cutting tool (20) is a rotary cutting tool, designed to rotate about a rotational axis.

32. The tool holder (22) according to claim 1, wherein none of the at least three mass recesses (64) is formed entirely in the mass peripheral surface (58).

33. The tool holder (22), according to claim 1, wherein:
in an end view of the vibration absorbing mass (54), peripheral surfaces (63) of at least some of said resilient suspension members (62) protrude radially outward of the mass peripheral surface (58).

34. A tool holder (22), elongated along a holder longitudinal axis (B) thereof and comprising:
a mass housing portion (40); and
an anti-vibration arrangement (34) comprising:
an interior holder cavity (36) formed in the mass housing portion (40) and having an inwardly facing cavity wall surface (38);
a vibration absorbing mass (54) having a mass central axis (E) and comprising:
two axially opposite mass ends (60), each mass end (60) having a mass end surface (56);
a mass peripheral surface (58) extending between the two mass end surfaces (56) about the mass central axis (E), and
at least three mass recesses (64) at each mass end (56), each mass recess (64) having a non-annular shaped, resilient suspension member (62) partially located therein and protruding outwardly therefrom,
wherein:
at each mass end (60), all of said at least three mass recesses (64) have a non-annular shape and are not configured for receiving an o-ring;
none of the at least three mass recesses (64) at each mass end (60) is formed entirely in the mass peripheral surface (58), each mass recess (64) being at least partially formed in one of the mass end surfaces (56);
none of the least three mass recesses (64) at each mass end (60) is intersected by the mass central axis (E);
in both end views of the vibration absorbing mass (54), the at least three suspension members (62) at each of the two mass ends (6) are visible; and
the tool holder (22) is adjustable between an unassembled state and an assembled state, and in the assembled state:
the vibration absorbing mass (54) is disposed in the interior holder cavity (36) and is elastically suspended therein by the at least three suspension members (62) at each mass end (60) contacting the inwardly facing cavity wall surface (38), and thereby forming an oscillating space (68) located between the vibration absorbing mass (54) and the inwardly facing cavity wall surface (38).

35. The tool holder (22), according to claim 34, wherein:
in an end view of the vibration absorbing mass (54), peripheral surfaces (63) of at least some of said resilient suspension members (62) protrude radially outward of the mass peripheral surface (58).

36. The tool holder (22), according to claim 34, wherein:
in said end views of the vibration absorbing mass (54), all of the at least three suspension members (62) at one mass end (60) are seen to be angularly offset from all of the at least three suspension members (62) provided at the opposite mass end (60).

\* \* \* \* \*